(12) United States Patent
Huang et al.

(10) Patent No.: US 6,699,427 B2
(45) Date of Patent: Mar. 2, 2004

(54) MANUFACTURE OF CARBON/CARBON COMPOSITES BY HOT PRESSING

(75) Inventors: Dai Huang, Sagamore Hills, OH (US); Irwin C. Lewis, Strongsville, OH (US); William David Cate, Brentwood, TN (US); Richard T. Lewis, Auburn, OH (US)

(73) Assignee: UCAR Carbon Company Inc., Wilmington, DE (US)

( * ) Notice: Subject to any disclaimer, the term of this patent is extended or adjusted under 35 U.S.C. 154(b) by 0 days.

(21) Appl. No.: 10/205,859

(22) Filed: Jul. 26, 2002

(65) Prior Publication Data

US 2004/0017019 A1 Jan. 29, 2004

(51) Int. Cl.⁷ .......................... B29B 11/16; B29C 35/00
(52) U.S. Cl. .................... 264/434; 264/29.2; 264/29.5; 264/29.7; 264/125; 264/126; 264/450; 264/451
(58) Field of Search ................................ 264/29.2, 29.5, 264/29.7, 125, 126, 434, 450, 451

(56) References Cited

U.S. PATENT DOCUMENTS

| | | | | |
|---|---|---|---|---|
| 2,509,652 A | * | 5/1950 | Rushmer et al. ............. | 264/430 |
| 3,001,237 A | | 9/1961 | Balaguer | |
| 3,728,423 A | * | 4/1973 | Shaffer ....................... | 264/29.5 |
| 3,914,395 A | * | 10/1975 | Finelli et al. ................ | 423/448 |
| 4,457,967 A | | 7/1984 | Chareire et al. | |
| 4,544,412 A | | 10/1985 | Veltri et al. ................ | 106/286.5 |
| 4,722,817 A | | 2/1988 | Nakano et al. | |
| 5,007,508 A | | 4/1991 | Lacombe ...................... | 188/251 |
| 5,009,823 A | | 4/1991 | Kromrey | |
| 5,202,293 A | | 4/1993 | Okamoto et al. | |
| 5,256,448 A | | 10/1993 | De Castro .................. | 427/228 |
| 5,294,382 A | | 3/1994 | Goldberger | |
| 5,298,311 A | | 3/1994 | Bentson et al. | |
| 5,306,678 A | | 4/1994 | Yoshida et al. | |
| 5,439,080 A | | 8/1995 | Haneda et al. | |
| 5,476,679 A | | 12/1995 | Lewis et al. ................. | 427/122 |
| 5,525,558 A | | 6/1996 | Niwa et al. | |
| 5,556,704 A | | 9/1996 | Prevorsek et al. | |
| 5,609,707 A | | 3/1997 | Bazshushtari et al. | |
| 5,744,075 A | | 4/1998 | Klett et al. | |
| 5,979,615 A | | 11/1999 | Thompson et al. | |

(List continued on next page.)

FOREIGN PATENT DOCUMENTS

| | | |
|---|---|---|
| JP | 62-212263 | 9/1987 |
| JP | 63-112463 | 5/1988 |
| JP | 63-139053 | 6/1988 |
| JP | 63-151677 | 6/1988 |
| JP | 3-197358 | 8/1991 |
| JP | 4-154663 | 5/1992 |
| JP | 6-128061 | 5/1994 |
| JP | 11-349924 | 12/1999 |

OTHER PUBLICATIONS

"Friction Materials Tests F.A.S.T. Machine," Online posting Dec. 20, 2002. <http://www.linktestlab.com/fast.htm>.

(List continued on next page.)

Primary Examiner—Stephen J. Lechert, Jr.
(74) Attorney, Agent, or Firm—Waddey & Patterson, P.C.; James R. Cartiglia (57) ABSTRACT

A mixture of carbon-containing fibers, such as mesophase or isotropic pitch fibers, and a suitable matrix material, such as a milled pitch, is compressed while resistively heating the mixture to form a carbonized composite material having a density of about 1.5 g/cm³, or higher. The composite material is formed in under ten minutes. This is a significantly shorter time than for conventional processes, which typically take several days and achieve a lower density material. Consequently, carbon/carbon composite materials having final densities of about 1.6–1.8 g/cm³, or higher are readily achieved with one or two infiltration cycles using a pitch or other carbonaceous material to fill voids in the composite and rebaking.

22 Claims, 2 Drawing Sheets

U.S. PATENT DOCUMENTS

| | | | |
|---|---|---|---|
| 5,989,504 | A | 11/1999 | Wilson et al. |
| 5,993,905 | A | 11/1999 | Sheehan |
| 6,030,913 | A | 2/2000 | Heine et al. ................... 501/88 |
| 6,051,167 | A | 4/2000 | Withers et al. |
| 6,093,482 | A | 7/2000 | Park et al. |
| 6,132,877 | A | 10/2000 | Winckler et al. |
| 6,148,785 | A | 11/2000 | Rivers et al. |
| 6,183,583 | B1 | 2/2001 | Duval et al. |
| 6,248,269 | B1 | 6/2001 | Dietrich et al. ............ 264/29.1 |
| 6,376,431 | B1 | 4/2002 | Matsumoto et al. ........ 508/107 |

OTHER PUBLICATIONS

Cho, Donghwan, "Effect of Resin Impregnation Methods at the Early State of Densification on the Impregnation Efficiency, Microstructure, and Thermal Stability of Carbon-Carbon Composites," *J. Appl. Polym. Sci.,* 85:183–192 (No. 1, Jul. 2002).

Prime, R. Bruce. "Thermosets." In *Thermal Characterization of Polymeric Materials,* ed. Edith A. Turi, 435–569. New York, Academic Press, copyright 1981.

Goldstein and Dreher, "Monomeric Furfuryl Alcohol Impregnating Solutions for Porous Materials Should Have Long Storage Life and Give High Resin Yields When Cured. Use of Selected Catalysts Permits premixing of the Impregnating Solution so it is Always Ready for Use," *Industrial and Engineering Chemistry,* vol., 52, No. 1. pp. 57–58 (Jan., 1960).

Simandl and Kenan, "Microcrystalline Graphite" *Microcrystalline Graphite—in Geological Fieldwork, 1997, British Columbia ministry of Employment and Investment,* Paper 1998–1, pp. 240–1 to 240–3.

Nicholson, Geoffrey. "Comparing Friction Material Properties." Online posting. Dec. 20, 2002. <http://www.ifriction.com/reports100.htm>.

De Castro, Luiz Depine and Brian McEnaney. "SiC coating produced using Sol–Gel technique to inhibit the oxidation of carbon materials." In *Twentieth Biennial Conference on Carbon, Jun. 23–28, 1991, Extended Abstracts and Program,* sponsored by the American Carbon Society, 420–421.

Paccaud and Derre, "Silicon Carbide Coating by Reactive Pack Cementation—Part I: Silicon Carbide/silica Interation," *Chem. Vap. Deposition,* ©2000, 6, No. 1 pp. 33–40.

Raman et al., "Synthesis of Silicon Carbide Incorporate Carbon/Carbon Composites," *Journal of Materials Science Letters,* 20, ©2001, pp. 315–317.

Hawley's Condensed Chemical Dictionary 13th edition.copyright 1997 publisher Wiley, pp. 97–98.

*Carbon Fiber/Carbon Composites: Production, Properties and Applications,* " Introduction to Carbon Technologies", Eds. Marsh, et al., University of Alicante 1997.

Nakagawa, et al., *Improved Manufacturing Process for Carbon/Carbon Composites and Their Mechanical Properties and Uses,* Ind Heating, 61:37–40 (Aug. 1994); Journal.

Park, Yang–Duk, et al., *Fabrication of C/C Composites by Hot–Pressing of Pitch–Impregnated Fabrics,* IN: Carbon '92 . . Essen, Jun. 22–26, 1992, p. 744–746; TP–245.C4–D48–1992–Ref.

Sudani, Kiyoshi, et al., *Carbon Fiber–Reinforced Carbon Composite Produced With a Pitch Binder,* Tetsu–ToHagane, 75:1426–1433 (No. 9, 1989); CA112:61522Z; not owned.

Sudani, Kiyoshi, et al., *Carbon Fiber Reinforced Carbon Composite Produced With Pitch Binder,* Tetsu–To–Hagane, 75:1426 (1989), Abstract in ISIJ, Intern., 29:A–75 (No. 10, 1989); not owned.

Chang, Tongshik, et al., *Fabrication of Carbon—Carbon Composites by Using Carbon Fibers Impregnated With Resin and Their Mechanical Properties,* Iron Steel Inst., Japan, Trans., 27:229–237 (No. 3, 1987), Based on paper presented to the 111th ISIJ Meeting, Apr., 1986, S712, at the Univ. of Tokyo in Tokyo, Journal.

Rogailin, M.I., et al., *Formation of a Composite Carbon-Carbon Material and Study of Its Properties,* Solid Fuel Chem., 19:132–137 (No. 4, 1985), Translated from Khim. Tverd.Topl., 19:137–142 (No. 4, 1985), Journal.

Anzai, Masahiro, et al., *Development of Carbon/Carbon Composites by Hot Pressing,* 13P. Frank C. Farnham Co. Translation, Translated from Seisan Kenky, 36:425–428 (No. 9, 1984); 85–2854–PR.

\* cited by examiner

MANUFACTURE OF CARBON/CARBON COMPOSITES BY HOT PRESSING

BACKGROUND OF THE INVENTION

1. Field of the Invention

The present application relates to a method for forming carbon/carbon composites suited for use as friction-bearing and structural materials for high temperature applications. It finds particular application in conjunction with a composite material formed by resistance heating of carbon fiber/binder mixtures during application of a compressive force and will be described with particular reference thereto. It should be appreciated that the method has application in other areas where the combined effects of pressure and temperature are desired.

2. Discussion of the Art

Carbon/carbon composites include those structures formed from a fiber reinforcement, which itself consists primarily of carbon, and a carbon matrix derived from a thermoplastic binder, such as pitch, or a thermosetting resin, such as a phenolic resin. Such materials are useful in applications where high temperature frictional properties and high strength to weight ratio are important. For example, carbon/carbon composites are known to be effective for providing thermal barriers and friction-bearing components, particularly in aircraft, aerospace vehicles, and high performance road vehicles. Carbon/carbon composites have been used for forming brake pads, rotors, clutches, and structural components for these vehicles. They tend to exhibit good temperature stability (often up to about 3000° C., or higher), high temperature friction properties (typical coefficients of friction are in the range of 0.4–0.5 above 500–600° C.), high resistance to thermal shock, due in part to their low thermal expansion behavior, and lightness of weight. Thermal insulation materials formed from certain types of carbon fibers exhibit excellent resistance to heat flow, even at high temperatures.

A common method of forming carbon/carbon composites begins with layup of a woven fiber fabric or pressing a mixture of carbonized fibers, such as cotton, polyacrylonitrile, or rayon fibers, and a fusible binder, such as a phenolic resin or furan resin. In the process, the fibers are first impregnated with resin to form what is commonly known as a prepreg. Multiple layers of the prepreg are assembled in a mold of a heated press. The prepreg is compressed while simultaneously applying heat to the mold at temperatures of 200° C.–350° C. for a period of six hours or more to cure the resin fully. The fiber and cured resin composite is then heated at a slow rate to a final temperature of about 800° C. in a separate operation to convert the binder to carbon. This carbonization step is carried out in an inert atmosphere and often takes about eighty hours to complete. Typically, the density of the carbon composite thus formed is up to about 0.6 to 1.3 g/cm$^3$.

For applications such as brake components and other friction-bearing applications, a density of about 1.7 g/cm$^3$ or higher is generally desired. To reduce voids in the pressure and heat-treated preform and increase its density, the preform is infiltrated with a phenolic resin or other carbonizable matrix material using a vacuum followed by pressure and the infiltrated material is then carbonized by heating. Densification is also often accomplished by chemical vapor infiltration (CVI) or chemical vapor deposition (CVD). The selected infiltration process is generally repeated six to ten times before the desired density is achieved. A final processing step may include graphitization of the preform by heating it in an inert atmosphere to a final temperature not exceeding about 3200° C. Above this temperature, carbon from the composite material tends to vaporize.

The lengthy heating and infiltration times render such composites expensive and impractical for many applications. For example, it may take about five months to form a carbon/carbon composite article, depending on the number of densification steps. Accordingly, sintered metal articles are commonly used for thermal applications, despite their greater weight and often poorer thermal stability and friction properties.

The present invention provides a new and improved method of forming a dense carbon/carbon composite, which overcomes the above-referenced problems and others.

SUMMARY OF THE INVENTION

In accordance with one aspect of the present invention, a method of forming a composite material is provided. The method includes combining a reinforcement material, which includes carbon-containing fibers, with a carbonizable matrix material to form a mixture and heating the mixture to a sufficient temperature to melt at least a portion of the matrix material and remove at least a portion of the volatile components from the matrix material. The heating step includes applying an electric current to the mixture such that heat is generated within the mixture. While heating the mixture, a pressure of at least 35 Kg/cm$^2$ is applied to the mixture to form a compressed composite material.

In accordance with another aspect of the present invention, an apparatus for forming a compressed composite material is provided. The apparatus includes a vessel, which defines a cavity for receiving a material to be treated. A means for applying pressure applies a pressure of at least 35 kg/cm$^2$ to the material in the cavity. A source of electrical current applies a current through the material to resistively heat the material. A temperature detector detects the temperature of the material. A control system controls the pressure applying means and the source of electrical current such that the mixture is sequentially heated at a first temperature and pressed at a first pressure for a first period of time, and heated at a second temperature higher than the first temperature and pressed at a second pressure higher than the first pressure for a second period of time.

In accordance with another aspect of the present invention, a method of forming a composite material suitable for vehicle brakes is provided. The method includes compressing a mixture of carbon fibers and a matrix material which includes pitch. During the step of compressing, a current is applied to the mixture. The mixture provides sufficient electrical resistance to the current such that the mixture reaches a temperature of at least 500° C. to drive off volatile components of the mixture and form a compressed preform. A carbonizable material is introduced into voids in the compressed preform to form an impregnated preform. The product may be heated to carbonize the carbonizable material. The introduction and baking steps are optionally repeated. The impregnated preform is graphitized to a final temperature of from about 1500° C. to about 3200° C. to form the composite material. The composite material has a density of at least 1.7 g/cm within two introduction steps.

An advantage of at least one embodiment of the present invention is that carbon-carbon composites, such as insulation and brake component materials, are formed in much shorter periods of time than by conventional hot pressing methods.

Another advantage of at least one embodiment of the present invention is that the density of the hot pressed material is higher than in conventional preforms, thereby enabling desired densities to be achieved with fewer densification and carbonization cycles.

Another advantage of at least one embodiment of the present invention is that a composite material is formed using fewer processing steps.

Still further advantages of the present invention will be readily apparent to those skilled in the art, upon a reading of the following disclosure and a review of the accompanying drawings.

DETAILED DESCRIPTION OF THE PREFERRED EMBODIMENT

A method of forming a carbonaceous material suitable for use in thermal applications, such as friction components, employs resistance heating of a mixture of a carbon reinforcement material, such as carbon fibers, and a matrix material, such as powdered pitch. The resistance heating step is accompanied by application of mechanical pressure to densify the mixture. After hot-pressing, the compressed composite or "preform" is preferably subjected to one or more infiltration steps employing a carbonizable resin or binder to increase the density of the composite material. The densified preform is then heat-treated to a final temperature of up to about 3200° C. to remove remaining non-carbon components, such as hydrogen and heteroatoms (e.g., nitrogen, sulfur, and oxygen), and form a carbon/carbon composite material which is almost exclusively carbon.

Figure 1:
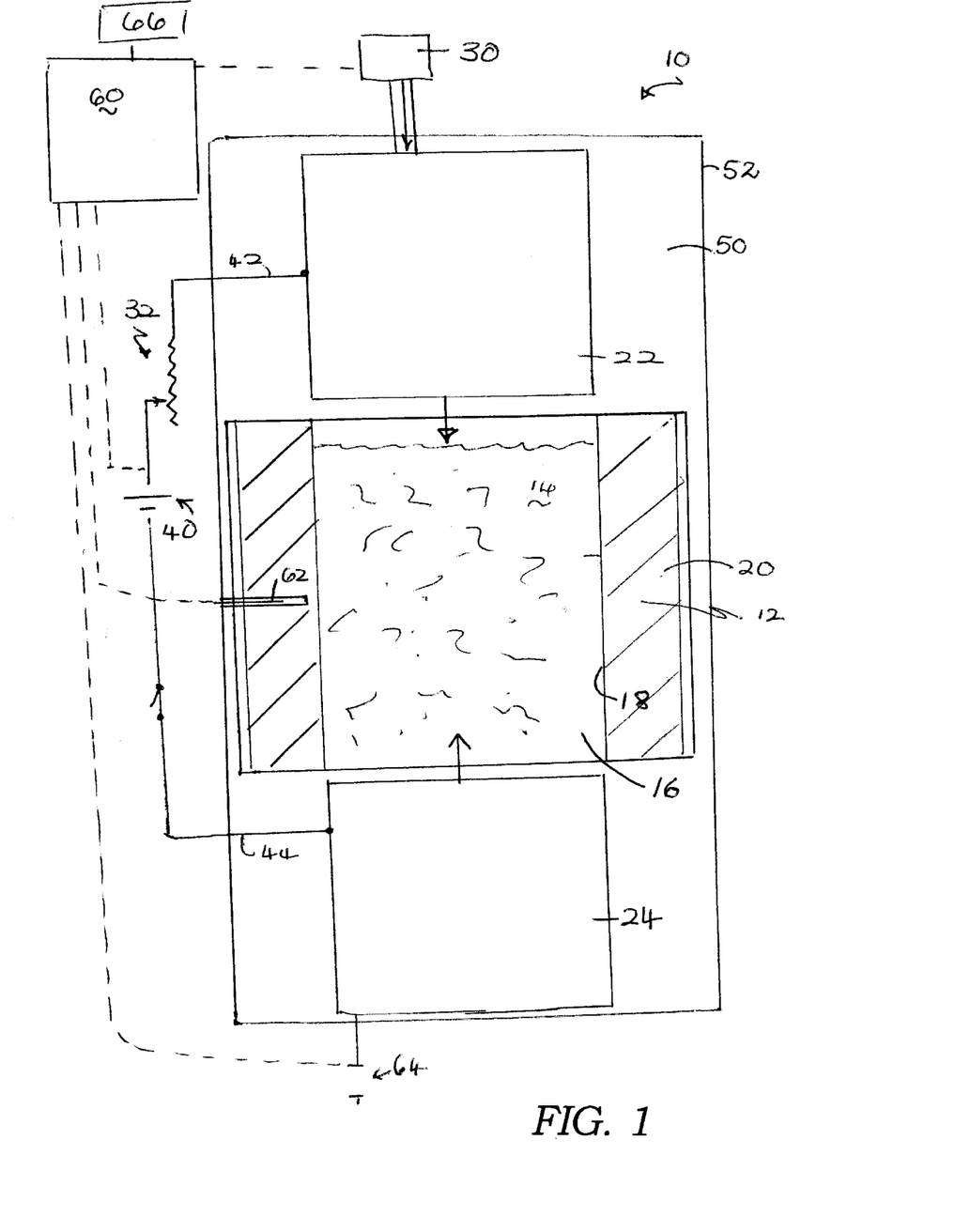
FIG. 1 is a side sectional view of a hot press according to the present invention.

An exemplary hot press 10 suited to resistively heating and compressing the mixture is shown in FIG. 1. The hot press includes a mold box 12, which defines a rectangular cavity 14, shaped to receive the mixture 16 of fibers and matrix material. The cavity is surrounded on four sides 18 by a block or panels 20 of an insulation material, such as a refractory material, which is both electrically and thermally insulative. Pressure is applied to the mixture by upper and lower pistons 22, 24, which are pushed toward each other by application of a compressive force to one or both of the pistons. It will be appreciated that the compressive force may alternatively or additionally be applied from opposed sides 18 of the mixture.

A hydraulic system 30, or other suitable system for applying pressure to the piston(s) 22, 24 urges the pistons together. A resistive heating system 32 applies a current to the mixture. The resistive heating system includes first and second electrodes, which are in electrical contact with the mixture. In a preferred embodiment, the pistons 22, 24 also serve as electrically conductive members, i.e., as the first and second electrodes, respectively, and are formed from an electrically conductive material, such as steel. In an alternative embodiment, the electrodes are separate elements, which may apply the current from the same direction as the pistons 22, 24, or from a different direction (e.g., through the sides 18 of the hot press).

The resistive heating system 32 includes a source of electrical power for providing a high current at low voltage, such as an AC supply 40. High DC currents are also contemplated. The AC or DC supply is electrically connected with the electrodes 22, 24 by suitable electrical wiring 42, 44. The mixture of matrix material and fibers 16 is sufficiently conductive to allow current to flow through the material and complete and electrical circuit with the first electrode 22 and second electrode 24 and power source 40, while having sufficient electrical resistance to generate heat within the material 16 as the current flows between the electrodes 22, 24. The heating rate is preferably at least 100° C./min and can be as high as about 1000° C./min, or higher. The resistance heating rapidly heats the entire mixture 16 to a suitable temperature for removal of volatile materials and carbonization of the matrix, typically in a matter of a few seconds or minutes, creating voids or bubbles within the mixture. Mechanical pressure is applied to densify the mixture 16 as the applied heat drives off the volatile materials.

The hot press 10 is preferably contained within a chamber 50 of a thermally insulative housing 52. An exhaust system (not shown) optionally removes volatile gases from the chamber 50.

The construction of the hot press 10 is such that all parts of the mixture 16 within the cavity 14 are subjected to a uniform pressure and to a uniform current flow. This results in the product having substantially uniform characteristics throughout the mass and which is substantially free of fissures and other irregularities which tend to result in fracture during use.

A control system 60 monitors the current applied to the mixture 16 and other parameters of the system. For example, the temperature of the mixture 16 is measured with a thermocouple 62, or other temperature monitoring device, mounted through the block 20 of the hot press or in a passage in thermal contact therewith. Displacement of the pistons 22, 24 relative to each other is detected with a displacement detector 64 from which estimates of the mixture density can be made. The control system 60 receives signals from the thermocouple 62 and displacement detector 64, corresponding to the temperature and linear displacement, respectively, and measurements of electrical current, voltage across the material, and hydraulic pressure from the current source 40 and hydraulic system 30. A processor 66 associated with the controller 60 compares the detected measurements with a preprogrammed set of desired values and instructs the control system to adjust certain parameters, such as the applied current and hydraulic pressure, to achieve a product with the desired characteristics in terms of density, composition, and so forth.

Figure 2:
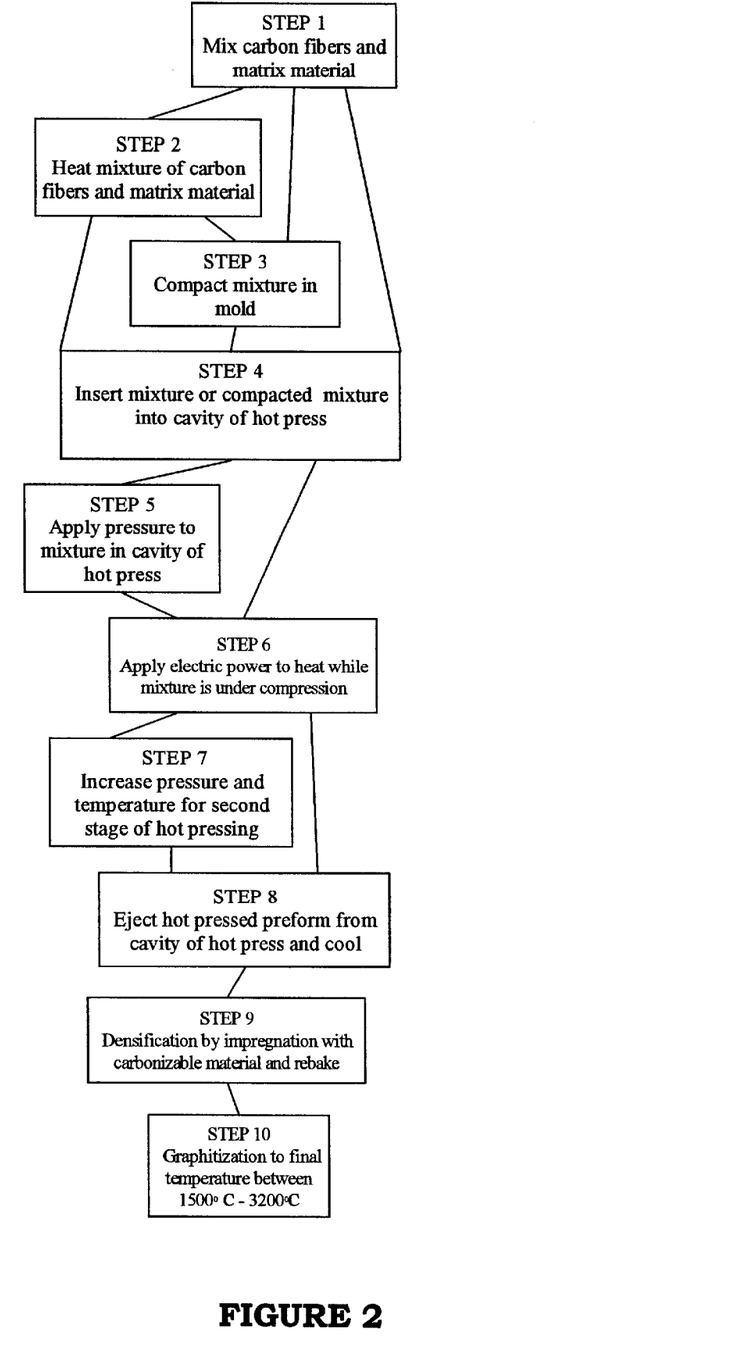
FIG. 2 is a flow chart showing steps of an exemplary process scheme for forming a carbon/carbon composite material according to the present invention.

With reference to FIG. 2, a flow chart representing the sequence of steps involved in an exemplary embodiment of the manufacture of a carbon/carbon composite material is shown.

In Step 1, a carbon reinforcement material, preferably including carbon fibers, is combined with a matrix material. The matrix material acts as a binder and a filler to fill gaps between the fibers. Preferably, the mixture 16 includes about 50–80% by weight of fibers and about 20–50% of the matrix material, more preferably, less than about 40% of the matrix material, by weight. Other carbonizable and carbonaceous additives may be incorporated into the mixture. For example, a carbon material, which is electrically more conductive than the fibers or matrix material, such as powdered graphitized carbon, may be added to the mixture to increase the conductivity of the mixture if the resistance is too high for current to flow during resistive heating.

Suitable carbon fibers for use as the reinforcement material include those formed from pitch, such as mesophase pitch or isotropic pitch, polyacrylonitrile (PAN), rayon, cotton, cellulose, other carbonizable materials, and combinations thereof.

The particular choice of carbon fibers depends on the anticipated end use of the composite material. For example, mesophase pitch carbon fibers provide the material with good thermal conductivity, once graphitized. Composites formed from mesophase pitch carbon fibers thus provide effective heat sinks for electronic components. Isotropic pitch carbon fibers exhibit a low thermal conductivity and provide good thermal insulation. PAN-based carbon fibers exhibit high strength and are thus suited to formation of structural components.

The fibers may be comminuted by a process such as chopping and/or milling. The carbon fibers preferably have an aspect ratio equal to or greater than 20:1, more preferably, greater than 100:1, a length of from about 2–30 mm, and a diameter of about 5–15 microns. Carbon reinforcements may also take the form of continuous filament yarn, chopped yarn, or tape made from continuous filaments and which are referred to as unidirectional arrays of fibers. Yarns may be woven in desired shapes by braiding or by multidirectional weaving. The yarn, cloth and/or tape may be wrapped or wound around a mandrel to form a variety of shapes and reinforcement orientations. For ease of handling, bundles of chopped filaments of about 0.2 cm to about 3 cm in length are preferred. Each bundle may comprise about 200–20,000 fiber filaments, each filament having a diameter of about 5–15 microns. Preferably, the bundles are of different lengths, with some bundles having relatively longer fibers (e.g., 2–3 cm in length), while other bundles have relatively shorter fibers (e.g., 0.2–1.0 cm in length). As used herein, the term "fibers" is intended to encompass all elongated carbon-containing reinforcement materials having a length which is at least twenty times, more preferably, at least 100 times the fiber diameter.

Exemplary fibers include mesophase pitch carbon fiber, obtained from Mitsubishi Gas & Chemical Co., 520 Madison Ave., New York, or Cytec Industries Inc., 5 Garrett Mountain Plaza, West Patterson, N.J. 07424, and PAN carbon fibers from Zoltek, Companies, Inc., 3101 McKelvey Rd, St Louis, Mo. 63044, or Toray Industries (America), Inc., 600 Third Ave., New York N.Y. 10016.

The matrix material provides an independent source of carbon upon pyrolytic decomposition. The matrix material is fusible (i.e., capable of melting) and contains both volatile and non-volatile components. The matrix material decomposes on heating to form an infusible material which is primarily carbon with the release of volatiles. Matrix materials which may be used to form carbon/carbon composites include liquids and solids which become sufficiently liquid or have low enough viscosity upon melting to coat the fibers. Preferred matrix materials are finely comminuted solids. Exemplary matrix materials include pitch, furan resins, and phenolic resins. Powdered pitch is a particularly preferred matrix material. Mesophase pitches and isotropic pitches with carbon yields of 60% or higher, more preferably, 70% or higher upon coking are particularly preferred as matrix materials. These pitches are produced from petroleum or coal tar, although it is also contemplated that the pitch matrix material may be synthetically formed. Pitch/sulfur mixtures are also suitable as matrix materials. While the matrix material is described with particular reference to milled pitch powder, it will be appreciated that other matrix materials are also contemplated. However, for matrix materials with lower carbon content, such as phenolic resins, it has been found that the quantity of volatile components which are released during hot pressing is disadvantageous to forming a product of high density. It has also been found that pitch-based matrix materials yield a product with improved friction properties as compared with those employing phenolic resins.

The pitch or other matrix material is preferably in the form of a powder or other finely divided material having an average particle size of less than about 1000 microns, more preferably, less than 100 microns. The desired particle size can be achieved by milling or other comminution process. Exemplary pitch materials include coal tar pitches, available from Rutgers VFT AG, Reilly Industries, Inc., and Koppers Industries, Inc.

The matrix material and reinforcement material may be "dry mixed," i.e., mixed without addition of solvents and at a temperature at which the matrix material is still a solid. More preferably, heat is applied during the mixing phase to raise the temperature of the matrix material above its softening point, which is about 70–350° C. in the case of pitch (Step 2). Preferably, the mixture is heated to about 30° C. or more above the Mettler softening point of the matrix material to reduce the viscosity of the matrix material. A Sigma-type mixer or similar is preferably used to ensure the fibers and pitch are intimately blended. A blending time of about 10–30 minutes is generally sufficient.

While the process is preferably carried out in the absence of additional liquids, such as water or an organic solvent, it is also contemplated that a small amount of an organic solvent may be mixed with the matrix and reinforcement materials to act as a plasticizer for the matrix material and reduce the mixing temperature. Other methods, which involve forming a slurry with a volatile liquid and drying the slurry to form a preform, are less desirable since they add to the number of processing steps and increase processing time.

With continued reference to FIG. 2, in Step 3, the mixture of carbon fibers and pitch powder is optionally packed into a separate mold from the mold box 12 of the hot press and pressed into a brick form having a density of about 0.5–1.0 g/cm$^3$ and dimensions only slightly smaller than those of the mold cavity.

In Step 4, the brick of fibers and pitch is transferred to the cavity 14 of the hot press mold box 12 (FIG. 1). In an alternative embodiment, Step 3 is eliminated and the mixture of fibers and matrix material is transferred directly to the mold box 12 from the mixer. The lower piston/electrode 24 is raised to a position in which it forms a base of the mold cavity 14 prior to introduction of the mixture/brick 16.

In Step 5, pressure is applied to compress the mixture 16. The pressure applied is partly dependent on the desired final density of the composite material. In general, a pressure of at least 35 kg/cm$^2$ is applied. The applied pressure can be up to about 150 kg/cm$^2$, or higher.

In Step 6, the mixture 16 is resistively heated while continuing to apply pressure to the mixture. It is also contemplated that heating may commence concurrently with, or before the start of application of pressure, particularly when the pre-pressing step (Step 3) is employed. Preferably, both heating and application of pressure are carried out concurrently, for at least a part of the process time, to densify the material as the volatile materials are given off.

The temperature of the mixture 16 during resistive heating is preferably sufficient to melt the pitch, remove volatiles from the pitch, and facilitate compression of the fiber matrix mixture as the pitch material is rigidized. It should be appreciated that, since pitch is generally not a homogeneous material, a portion of the pitch matrix material may remain unmelted (for example, quinoline insoluble solids tend not to melt), even at temperatures significantly above the softening point. Additionally, while substantially all the volatiles are removed in this step, it is also contemplated that a portion of the volatiles may remain without unduly affecting the properties of the material.

The mixture preferably reaches a temperature of above the carbonization temperature, which is about 500° C. in the case of pitch matrix material. For example, the mixture is heated to at least about 700° C., more preferably, about 800–900° C., although higher temperatures are also contemplated. The power input applied during resistive heating depends on the resistance of the mix and the desired temperature. For a mixture of pitch and carbon fibers, a power input of up to about 60 kW/kg is applied, preferably in the range of 45–60 kW/kg, for at least part of the heating process. For example, a power input of about 45–60 kW/kg is applied for 90 seconds to 2 minutes, which may be preceded by application of pressure alone for about 3 to 5 minutes.

In another embodiment, a two stage process is used. In a first stage (Step 6), a relatively low power input, preferably in the range of about 30 kW/kg is applied for a period of about 30 seconds. In this stage, the temperature is preferably in the range of about 300° C. to 500° C. The bulk of the volatiles are removed from the mixture in this temperature range. Above a certain temperature, about 500° C. in the case of pitch matrix material, the pitch becomes rigid (carbonizes) and it is more difficult to remove the volatiles from the mixture without disruption of the structure. Accordingly, in the first stage, the temperature is preferably kept below the curing temperature of the matrix material.

In the second stage (Step 7), the temperature is increased to a higher temperature (e.g., above about 700° C., more preferably, 800–900° C.), sufficient to carbonize the matrix material. In this stage, the power input may be from about 45 kW/kg to about 60 kW/kg to bring the temperature up to about 800–900° C. The power is maintained at this level for about 1–2 minutes, or longer. The optimum time depends on the applied power input, resistance, and other factors The first and second stages are preferably also associated with different applied pressures. In the first stage (Step 6), for example, the pressure is lower than in the second stage (Step 7). The lower pressure reduces the opportunity for volatile gases to be trapped in the mixture, causing violent disruption of the mixture as they escape. For example, a pressure of about 35–70 kg/cm$^2$ is employed for the first stage, while an increased pressure of about 100–150 kg/cm$^2$ is employed for the second stage.

The resistance heating/pressing step (Step 6 and/or Step 7) takes under three hours, preferably, about 30 minutes or less, more preferably, less than about ten minutes, most preferably about 5–8 minutes, which is a much shorter time than the days required in conventional heating/pressing systems. Additionally, the density of the preform formed in this step is preferably at least 1.3 g/cm$^3$, more preferably, at least 1.4 g/cm$^3$, most preferably, about 1.5 to 1.7 g/cm$^3$. This is much higher than the density generally achieved in conventional methods, where the density of the fiber/matrix preform is about 0.6–1.3 g/cm$^3$ without further densification procedures. As a consequence, fewer infiltration cycles (Step 9) are used to achieve a final desired density (generally 1.7–1.9 g/cm$^3$, more preferably 1.75–1.85 g/cm$^3$) with the resistive heating method than with conventional hot pressing methods. This decreases the number of processing steps and reduces the overall processing time even further. For example, where six or more infiltration steps are commonly used in a conventional process, the present process accomplishes a final density of about 1.75–1.85 g/cm$^3$ in only one or two infiltration steps. Whereas the conventional method may take several months from start to finished product, the present resistive heating method reduces the time to a matter of days or weeks.

In step 8, the hot-pressed preform is discharged from the mold cavity 14 and cooled. Preferably, the preform is cooled rapidly to a temperature below which oxidation does not occur at a significant rate. For example, the preform is immersed in water or sprayed with droplets or a mist of water to bring its temperature below about 400–500° C. Alternatively, cooling may be achieved with an inert gas flow.

While the preform is readily formed in the shape of a rectangular brick, it is also contemplated that the mold cavity may be configured to produce a preform of a cylindrical or other shape, thereby reducing or eliminating the need for subsequent machining to form a desired component part.

Further densification of the cooled preform takes place in Step 9. In this step, a carbonizable material is introduced into the preform body by pitch or resin impregnation or chemical vapor infiltration (CVI). After each infiltration step, the body is preferably rebaked in Step 9 to carbonize the carbonizable material. It has been found that a target density of about 1.6–1.8 g/cm$^3$ is readily achieved with only a single infiltration step. A density of 1.7 g/cm$^3$, or more, is readily achieved within two such infiltration steps. Preferably, infiltration is carried out by impregnation of liquid pitch. In this process, the preform is placed in a vacuum chamber and the chamber evacuated. Molten pitch is introduced to the chamber and penetrates into the evacuated pores in the preform, with the aid of applied pressure.

In step 9, the body is heated slowly in a furnace, for example, at a heating rate of about 10° C./hour to a final temperature of about 800–900° C. The body is preferably held at this temperature for about 2–3 hours and then the power is removed. The body cools slowly, over a period of two to three days, to a temperature of about 100° C. before being removed from the furnace. Each carbonization step thus takes about 5–6 days to complete. Having fewer infiltration and carbonization cycles therefore reduces the overall densification time.

In an alternative densification process, the preform is exposed to an atmosphere of a gaseous hydrocarbon, such methane, ethane, propane, benzene, and the like, or a mixture thereof. The hydrocarbon gas decomposes, or is cracked, for example at a temperature of about 980° C. to about 1,150° C. to form elemental carbon, which is deposited within the carbon/carbon composite.

At Step 10, the body is subjected to a graphitization process. In this step, the body is heated in an inert atmosphere, for example, in an induction furnace, to a temperature of about 1500° C., or higher, more preferably, about 2000° C. to 3200° C., most preferably, 2400° C.–3200° C., to remove all (or substantially all) hydrogen and other heteroatoms and produce a carbon/carbon composite. Above about 2400° C., the composite is fully graphitized. The carbonization temperature is selected according to the end use of the final product and is generally above the highest temperature to which the composite material is to be subjected in use.

During this carbonization or graphitization process, various physical properties of the composite material, such as its thermal and electrical conductivity, are substantially increased, making the composite material suitable for various high temperature commercial applications. The period of time for this procedure is calculated using conventional calculations based upon graphitization time/temperature kinetics, taking into account furnace thermal load and mass.

Once the general shape of the carbon/carbon composite article is fabricated, the piece can be readily machined to precise tolerances, on the order of about 0.1 mm or less. Further, because of the strength and machinability of carbon/carbon composites, in addition to the shaping possible in the initial fabrication process, carbon/carbon composites can be formed into a variety of shapes.

The resulting carbon/carbon composite material is suited to a wide range of applications, including use as brake components, antiskid components, and structural components, such as body panels, pistons, cylinders, for vehicles, such as aircraft, high performance cars, trains, and aerospace vehicles, missile components, and for use as susceptors in furnaces. The reduction in processing time achieved with the resistance heating method opens up many other applications for the material which have hitherto been impractical because of time and production cost constraints.

Typical properties of the carbon/carbon composites formed from mesophase pitch carbon fibers and milled pitch are as follows:

As-pressed density of the preform: 1.55–1.65 g/cm$^3$;

Final density after graphitization: 1.75–1.82 g/cm$^3$ (with two pitch impregnation/carbonization cycles)

Flexural strength: about 50 Mpa

Young's modulus: about 35 Gpa

Compressive strength: about 60 Mpa

Thermal conductivity: about 75 W/m·K.

The electrical conductivity of the graphitized material is generally in the range of about 9–10 $\mu\Omega$-m. With the exception of thermal conductivity, these properties were measured perpendicular to the fiber orientation (parallel to the current flow direction). Thermal conductivity was measured in the fiber orientation direction.

Without intending to limit the scope of the invention, the following examples demonstrates the improvements in processing times which can be achieved with the resistance heating method.

EXAMPLES

Example 1

Carbon/Carbon Composite Made by Dry Mixing of Precursor Materials

Mesophase pitch-based carbon fibers and a matrix material of milled pitch with 170° C. softening point and 70% coking yield were dry mixed at ambient temperature in a Sigma-type blender or similar type of mixer for about 5–15 minutes. The ratio of fibers to pitch matrix material was from 50–80 wt % fiber: 20–50 wt % pitch. The mixture was collected and charged into a mold box cavity (dimensions approximately 23×20 cm) of a hot press, as illustrated in FIG. 1. A pressure of up to about 140 kg/cm$^2$ was applied to the mixture in the press. After pressing to compact the mixture, an electric current of about 1000–2000 amps (a power input of about 30–60 kW/kg) was passed through the mixture. The mix was held under the temperature and pressure conditions for about 5–10 minutes. The temperature of the mixture reached 800–900° C. This hot pressing process carbonizes and densifies the fiber/matrix mixture in a very short period of time, compared with conventional processes. The as-pressed material (preform) had a carbonized density of about 1.6 g/cm$^3$. The preform underwent one or multiple pitch or resin impregnation cycles (preferably two), each one followed by re-carbonization, to densify the material. Lastly, the preform underwent graphitization to a temperature of about 3200° C. to obtain a product having a density of about 1.75 g/cm$^3$.

Example 2

Carbon/Carbon Composite Made by Hot Mixing of Precursor Materials

Various batches of mesophase pitch-based carbon fibers and a matrix material of milled pitch from Example 1 were hot mixed at a temperature of about 200° C. in a Sigma-type blender or similar type of mixer for about 30–45 minutes. The ratio of fibers to pitch matrix material was varied from about 50–80 wt % fiber: 20–50 wt % pitch. During the hot mixing, the matrix material coated the fibers uniformly. The mixture was collected and charged into a mold box cavity of a hot press, and heated and pressed as described for Example 1. Alternatively, the mixture was compacted in a separate mold to a density of between about 0.5 and 1.0 g/cm$^3$ prior to hot pressing.

A pressure of up to 140 kg/cm$^2$ was applied to the mixture in the hot press. After pressing to compact the mixture, an electric current as high as 1500–2000 A (a power input of about 45–60 kW/kg) was passed through the mixture. The mix was held under the temperature and pressure conditions for about 5–10 minutes. The temperature of the mixture reached 800–900° C. This hot pressing process carbonizes and densities the fiber/matrix mixture in a very short period of time, compared with conventional processes. The as-pressed material (preform) had a carbonized density of between about 1.4 and 1.65 g/cm$^3$. The preform underwent one or multiple pitch or resin impregnation cycles, each one followed by re-carbonization, to densify the material. Lastly, the preform underwent graphitization to a temperature of up to about 3200° C. to obtain a product having a density of about 1.70 to 1.75 g/cm$^3$.

Table 1 shows the as-pressed densities obtained for various fiber and pitch compositions (i.e., prior to infiltration and graphitization).

TABLE 1

| Carbon Fiber (wt %) | Pitch Binder (wt %) | As-pressed density (g/cc) |
|---|---|---|
| 75 | 25 | 1.61 |
| 65 | 35 | 1.56 |
| 55 | 45 | 1.37 |
| 45 | 55 | * |

*The block cracked after hot-pressing.

As can be seen from TABLE 1, the as-pressed density decreased as the pitch binder concentration was increased. Thus for applications where high as-pressed density is desired, it is preferable to keep the pitch binder concentration below about 40–45%.

Samples of the as-pressed composites having an as-pressed density of about 1.55–1.65 g/cm$^3$ were subjected to two infiltration/carbonization cycles. In each infiltration step, petroleum pitch was infiltrated into the composite. The samples to be infiltrated were first heated to a temperature of about 250° C. for 6–8 hours and then placed in a pressure vessel, which had been preheated to at least 200° C. A vacuum was pulled for 4–6 hours and then liquid pitch was introduced to the pressure vessel. Nitrogen was introduced to a pressure of 100 psi and the samples infiltrated with the liquid pitch for 10–12 hours. The pressure was then released from the vessel and the infiltrated composite samples retrieved.

The infiltrated composite was then carbonized by heating it in a furnace to a temperature of 800–900° C., using a heating rate of 10° C./hour. The temperature was held for about 2–3 hours. The power was removed and the composite allowed to cool from 900° C.–100° C. over a period of two to three days. The infiltration and carbonization steps were then repeated. The carbonized composite was then graphitized in an induction furnace by heating the material to a temperature of 3000° C. at a heating rate of 300° C./hour. The final temperature of 3000° C. was maintained for approximately one hour. Tests on the graphitized composite material produced the following results:

Final density after graphitization: 1.75–1.82 g/cm$^3$

Flexural strength: about 50 Mpa

Young's modulus: about 35 Gpa

Compressive strength: about 60 Mpa

Thermal conductivity: about 75 W/m·K.

Electrical conductivity: about 9–10 $\mu\Omega$-m.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of forming a composite material comprising:
    combining a reinforcement material which includes carbon-containing fibers with a carbonizable matrix material to form a mixture;
    heating the mixture to a sufficient temperature to melt at least a portion of the matrix material and remove at least a portion of volatile components from the matrix material, the step of heating including:
        applying an electric current to the mixture to generate heat within the mixture; and
    while heating the mixture, applying a pressure of at least 35 kg/cm$^2$ to the mixture to form a compressed composite material.

2. The method of claim 1, wherein the step of heating and applying pressure comprises heating the mixture to a temperature of at least 500° C. to form a compressed composite material having a density of at least 1.3 g/cm$^3$ within thirty minutes.

3. The method of claim 1, wherein the step of heating includes heating to a temperature of about 800° C. and wherein the compressed composite formed in the step of heating while applying a pressure has a density of at least 1.4 g/cm$^3$.

4. The method of claim 1, wherein the carbon-containing fibers are derived from precursors selected from the group consisting of carbonized rayon, cotton, polyacrylonitrile, polyacetylene, cellulose, pitch, and combinations thereof.

5. The method of claim 4, wherein the carbon-containing fibers include at least one of mesophase pitch carbon fibers and polyacrylonitrile carbon fibers.

6. The method of claim 1, wherein the matrix material is selected from the group consisting of phenolic resins, furan resins, coal tar pitch, petroleum pitch, and combinations thereof.

7. The method of claim 1, wherein the matrix material has a carbon yield of at least 50%.

8. The method of claim 6, wherein the matrix material comprises finely divided pitch.

9. The method of claim 1, wherein the step of heating comprises:
    heating the mixture for a first period of time at a first temperature by applying a first power level; and
    heating the mixture for a second period of time at a second temperature higher than the first temperature by applying a second power level higher than the first power level.

10. The method of claim 9 wherein the first power level is about 30 kW/kg and the second power level is from about 45 to about 60 kW/kg.

11. The method of claim 9, wherein the first temperature is in the range of from about 300° C. to about 500° C. and the second temperature is in the range of from about 800 to about 900° C.

12. The method of claim 9, wherein the pressure applied to the mixture in the first period of time is from about 35 kg/cm$^2$ to about 70 kg/cm$^2$ and the pressure applied to the mixture in the second period of time is at least about 100 kg/cm$^2$.

13. The method of claim 1, wherein the step of combining comprises combining about 50–80% by weight carbon-containing fibers with about 50–20% by weight carbonizable matrix material.

14. The method of claim 12, wherein the step of combining comprises combining about three parts by weight carbon-containing fibers with about one part by weight carbonizable matrix material.

15. The method of claim 11, wherein the step of combining the carbon-containing fibers and carbonizable matrix material comprises heating the carbonizable matrix material to a temperature above its melting point.

16. The method of claim 13, wherein the step of combining the carbon-containing fibers and carbonizable matrix material comprises dry mixing the matrix material and carbon-containing fibers in a blender without addition of solvent.

17. The method of claim 1, wherein the pressure is applied to the mixture in a direction in which the current is applied.

18. The method of claim 15, wherein the pressure is applied by first and second electrically conductive members, the step of applying an electric current to the mixture including forming an electrical conduction path between the mixture and the electrically conductive members.

19. The method of claim 1, further comprising:
    increasing the density of the compressed composite by introducing a carbonizable material into voids in the compressed composite and then baking the compressed composite to achieve a density of at least 1.6 g/cm$^3$.

20. The method of claim 1, further comprising:
    graphitizing the compressed composite in an inert atmosphere to a final temperature of at least 1500° C.

21. The method of claim 1, wherein the step of heating includes converting the matrix material to an infusible material.

22. A method of forming a composite material suitable for vehicle brakes comprising the steps of:

a) compressing a mixture of carbon fibers and a matrix material which includes pitch;

b) during the step of compressing, applying a current to the mixture, the mixture providing a sufficient electrical resistance to the current such that the mixture reaches a temperature of at least 500° C. to drive off volatile components of the mixture and form a compressed preform;

c) introducing a carbonizable material into the compressed preform to form an impregnated preform;

d) optionally, baking the product of step c) to carbonize the carbonizable material;

e) optionally repeating step c) and step d); and f) graphitizing the impregnated preform to a final temperature of from about 1500° C. to about 3200° C. to form the composite material, the graphitized preform having a density of at least 1.7 g/cm$^3$ if step c) is repeated no more than once.

* * * * *